(12) United States Patent
Sheehan et al.

(10) Patent No.: US 7,148,320 B2
(45) Date of Patent: Dec. 12, 2006

(54) POLYMER PURIFICATION

(75) Inventors: Michael T. Sheehan, Corpus Christi, TX (US); James R. Sounik, Corpus Christi, TX (US)

(73) Assignee: Dupont Electronic Polymers L.P., Research Triangle Park, NC (US)

( * ) Notice: Subject to any disclaimer, the term of this patent is extended or adjusted under 35 U.S.C. 154(b) by 5 days.

(21) Appl. No.: 10/995,468

(22) Filed: Nov. 24, 2004

(65) Prior Publication Data

US 2005/0187377 A1     Aug. 25, 2005

(51) Int. Cl.
*C08F 6/00*    (2006.01)

(52) U.S. Cl. .................. 528/499; 210/702; 528/491; 528/493; 528/494; 528/497

(58) Field of Classification Search ................ 210/702; 528/491, 493, 494, 497, 499
See application file for complete search history.

(56) References Cited

U.S. PATENT DOCUMENTS

| | | | | |
|---|---|---|---|---|
| 6,593,431 | B1 * | 7/2003 | Sheehan | 525/327.4 |
| 2004/0062927 | A1 * | 4/2004 | Percec | 428/405 |

* cited by examiner

*Primary Examiner*—Terressa Boykin
(74) *Attorney, Agent, or Firm*—James J. Mullen

(57) ABSTRACT

Polymers derived from various monomers are purified by fractionalization of the crude polymers in a solvent/non solvent system via reverse precipitation.

26 Claims, 1 Drawing Sheet

POLYMER PURIFICATION

BACKGROUND OF THE INVENTION

Figure 1:
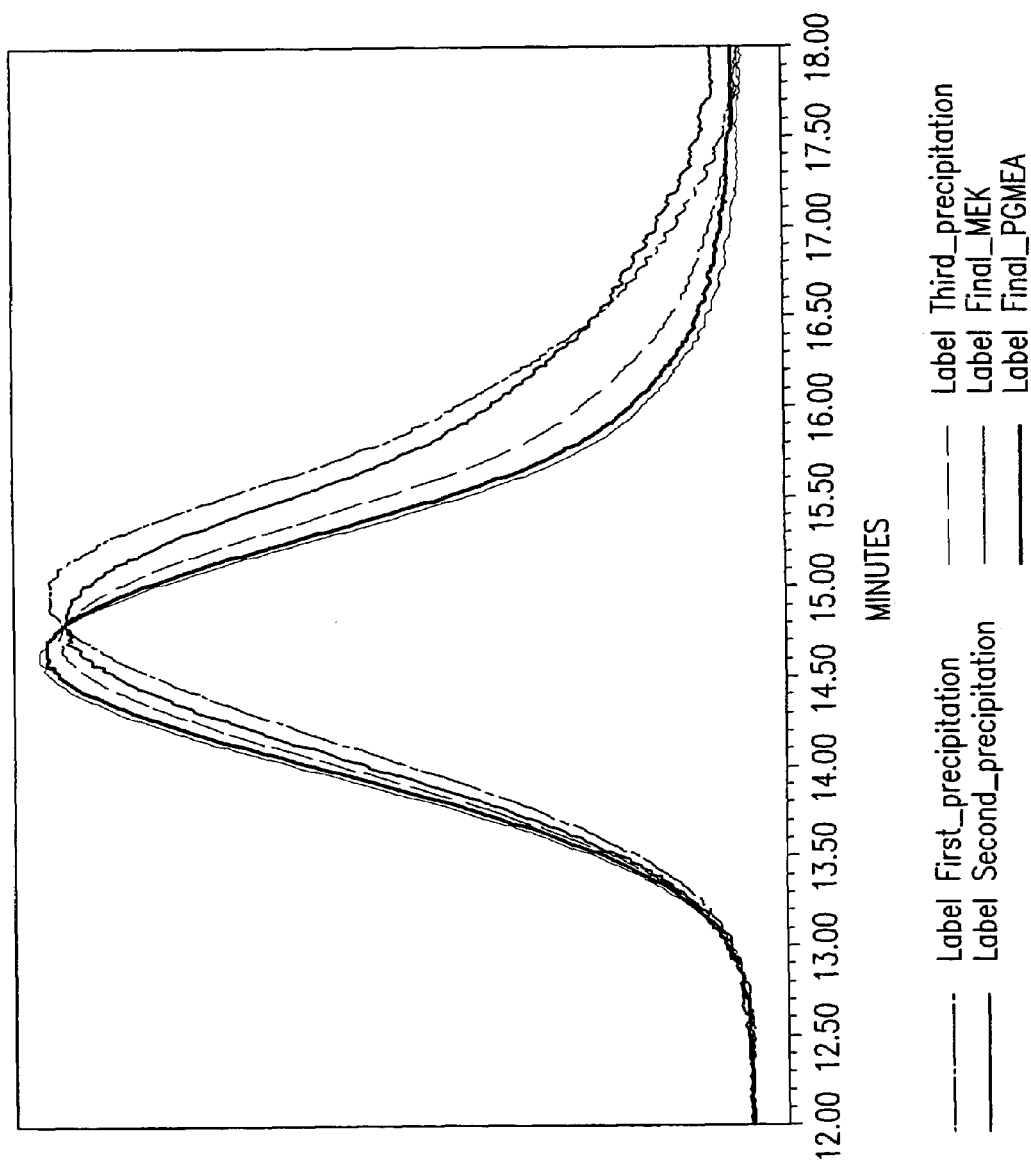

Polymers, including copolymers and terpolymers, when isolated from reaction solution are a mixture of compounds of varying composition and molecular weight. Typically they contain small quantities of starting material and by-products which are undesirable in the final polymer. The polymer generally undergoes further processing before its ultimate use. The subject of this invention thus pertains to a method of purifying the polymer, i.e. the crude polymer.

Davidson, in U.S. Pat. No. 5,945,251, discloses a method of purifying polyhydroxystyrene polymers by adding an amine, a hydrophilic solvent, a hydrophobic solvent, and water to the polymer; separating the aqueous phase; then removing the hydrophilic solvent and the hydrophobic solvent to form the purified polymer.

Zempini, et al. in U.S. Pat. No. 5,789,522 and U.S. Pat. No. 5,939,511, extracts impurities from a phenolic resin by dissolving the resin in a photoresist solvent and extracting the water-soluble impurities therefrom.

Sheehan et al in U.S. Pat. No. 6,414,110 B1 discloses a purification of a crude polymer by use of immiscible solvents to remove the low molecular weight polymers from the desired product.

SUMMARY OF THE DISCLOSURE

The present invention provides a novel process for improving the glass transition temperatures and reducing the polydispersity values of polymer intermediates that have been polymerized. The polymers to be treated are any polymer or polymer blend; however, some exemplary polymers that are susceptible to treatment with the method of this invention are polymers derived from acrylates and styrene derivatives such as 4-acyloxystyrene. These derived polymers can then be further processed to provide polymers useful in paints, resins, thickening agents, and in photoresist compositions. The present invention process is an improvement over the prior art and is quite efficient. Specifically the invention provides a method of removing unreacted monomers, low molecular weight polymers, and the like from the crude polymer mixture before or after further processing, for example, before a transesterification step. Many polymer properties can be utilized to quantify the improvement in the purity of polymers. Average molecular weight by Gel Permeation Chromatography, polymer composition by nuclear magnetic resonance, spectroscopy, and glass transition temperature by Differential scanning calorimetry are all effective in certain instances with certain molecules and characteristic side chains.

As previously described in the prior art, the crude polymer, for example, after polymerization, with or without the presence of a chain transfer agent (CTA) such as those that are described in WO 98 01478 and WO 99 31144, is further processed, for example, separated from the solvent by filtration, centrifugation, decantation, or the like. According to the method of this invention, the crude polymer is subject to fractionalization whereby it is substantially dissolved in a first solvent and then a non solvent (to the crude polymer) is combined whereby the polymer precipitates out, then, after removal of at least a portion of the first solvent and the non solvent, new quantities of the first solvent or a third solvent are combined to redissolve the precipitated polymer. This procedure can be only a one time process or can be repeated as long as necessary to remove by-products and low molecular weight materials that are more soluble in the non solvent than the desired polymer. In this manner, the undesirable monomeric impurities and oligomers are soluble in the non solvent (the desired polymer has already precipitated out with the addition of the non solvent) and thus are removed during each fractionation step.

DETAILED DESCRIPTION OF THE INVENTION

This invention provides a process for the improvement in the composition of a wide variety of polymers containing repeat units derived from a monomer or monomers selected from the group consisting of (1) monomer I,

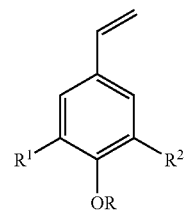

wherein R is either —C(O)R$^5$ or —R$^5$;

(2) an acrylate monomer having the formula II,

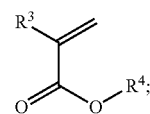

(3) one or more ethylenically unsaturated copolymerizable monomers (EUCM) selected from the group consisting of styrene, 4-methylstyrene, styrene alkoxide wherein the alkyl portion is $C_1$–$C_5$ straight or branch chain, tert.-butylstyrene, cyclohexyl acrylate, tert.-butyl acrylate, tert.-butyl methacrylate, maleic anhydride, dialkyl maleate, dialkyl fumarate and vinyl chloride.

wherein:
i) R$^1$ and R$^2$ are the same or different and independently selected from the group consisting of:
hydrogen;
fluorine, chlorine or bromine;
alkyl or fluoroalkyl group having the formula $C_nH_xF_y$ where n is an integer from 1 to 4,
x and y are integers from 0 to 2n+1, and the sum of x and y is 2n+1; and
phenyl or tolyl;
ii) R$^3$ is selected from the group consisting of:
hydrogen; and
methyl, ethyl, n-propyl, iso-propyl, n-butyl, iso-butyl or tert.-butyl;
iii) R$^4$ is methyl, ethyl, n-propyl, iso-propyl, n-butyl, i-butyl, tert.-butyl, t-amyl, benzyl, cyclohexyl, 9-anthracenyl, 2-hydroxyethyl, cinnamyl, adamantyl, methyl or ethyl or hydroxyl adamantyl, isobornyl, 2-ethoxyethyl, n-heptyl, n-hexyl, 2-hydroxypropyl, 2-ethylbutyl, 2-methoxypropyl, 2-(2-methoxyethoxyl), oxotetrahydrofuran, hydroxy-trimethylpropyl, oxo-oxatricyclo non yl, 2-naphthyl, 2-phenylethyl, phenyl, and the like; and iv) $R^5$ is $C_1$–$C_4$ alkyl;

and (4) mixtures of (1), (2), and (3).

For exemplary purposes only, the crude polymer can be typically manufactured by subjecting a monomer of formula I,

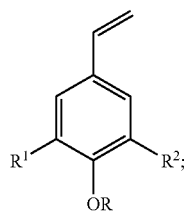

I or a monomer of the formula I and/or acrylate monomer II, and/or one or more of said copolymerizable monomers (EUCM) to suitable polymerization conditions in a first solvent and in the presence of a free radical initiator at suitable temperature for a sufficient period of time to produce a crude polymer of corresponding composition. After purification by the method of this invention, the purified polymer, for example, can be transesterified to a polymer containing the monomer of formula III:

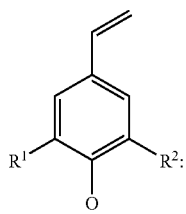

III by (1) subjecting said polymer to transesterification conditions in said first solvent in the presence of catalytic amounts of a base catalyst at suitable temperature such that the transesterified by-product ester formed is continuously removed from the reaction mixture to form the homopolymer of I or the copolymer of I, and/or II, and/or said copolymerizable monomer, (EUCM) or (2) subjecting the polymer to acidic hydrolysis with a strong acid. The polymer is then optionally passed through an ion-exchange bed to remove said base or acid catalyst.

It is also within the scope of the present invention to prepare a homopolymer of Formula I from the monomer of Formula III. As another embodiment, polyhydroxystyrene (PHS) can be prepared from acetoxystyrene monomer (ASM).

The scope of the present invention includes any crude polymer produced by any method and covers, for example, (a) a homopolymer of Formula I derived from Formula III monomer; (b) a copolymer derived from Formula II and Formula III monomers; (c) a copolymer derived from Formula III monomers and the EUCM; and (d) a terpolymer derived from monomers of Formula II, Formula III, and EUCM. It is also within the scope of the present invention to use other monomers such as norbornene monomers, fluorine monomers and the like to form a crude polymer product to be treated by the novel processes of the present invention.

In conjunction with Formula II (an acrylate monomer) set forth herein, some preferred acrylate monomers are (1) MAA-methyl adamantly acrylate, (2) MAMA-methyl adamantyl methacrylate, (3) EAA-ethyl adamantyl acrylate, (4) EAMA-ethyl adamantyl methacrylate, (5) ETCDA-ethyl tricyclodecanyl acrylate, (6) ETCDMA-ethyl tricyclodecanyl methacrylate, (7) PAMA-propyl adamantyl methacrylate, (8) MBAMA-methoxybutyl adamantyl methacrylate, (9) MBAA-methoxybutyl adamantyl acrylate, (10) isobornylacrylate, (11) isobornylmethacrylate, (12) cyclohexylacrylate, and (13) cyclohexylmethacrylate. Other preferred acrylate monomers which can be used are (14) 2-methyl-2-adamantyl methacrylate; (15) 2-ethyl-2-adamantyl methacrylate; (16) 3-hydroxy-1-adamantyl methacrylate; (17) 3-hydroxy-1-adamantyl acrylate; (18) 2-methyl-2-adamantyl acrylate; (19) 2-ethyl-2-adamantyl acrylate; (20) 2-hydroxy-1,1,2-trimethylpropyl acrylate; (21) 5-oxo-4-oxatricyclo-non-2-yl acrylate; (22) 2-hydroxy-1,1,2-trimethylpropyl 2-methacrylate; (23) 2-methyl-1-adamantyl methacrylate; (24) 2-ethyl-1-adamantyl methacrylate; (25) 5-oxotetrahydrofuran-3-yl acrylate; (26) 3-hydroxy-1-adamantyl methylacrylate; (27) 5-oxotetrahydrofuran-3-yl 2-methylacrylate; (28) 5-oxo-4-oxatricyclo-non-2-yl 2 methylacrylate.

Additional acrylates and other monomers that may be used in the present invention with the substituted styrene and CTA to form various copolymers include the following materials: Monodecyl maleate; 2-hydroxy ethyl methacrylate; isodecyl methacrylate; hydroxy propyl methacrylate; isobutyl methacrylate; lauryl methacrylate; hydroxy propyl acrylate; methyl acrylate; t-butylaminoethyl methacrylate; isocyanatoethyl methacrylate; tributyltin methacrylate; sulfoethyl methacrylate; butyl vinyl ether blocked methacrylic acid; t-butyl methacrylate; 2-phenoxy ethyl methacrylate; acetoacetoxyethyl methacrylate; 2-phenoxy ethyl acrylate; 2-ethoxy ethoxy ethyl acrylate; beta-carboxyethyl acrylate; maleic anhydride; isobornyl methacrylate; isobornyl acrylate; methyl methacrylate; ethyl acrylate; 2-ethyl hexyl methacrylate; 2-ethyl hexyl acrylate; glycidyl methacrylate; N-butyl acrylate; acrolein; 2-diethylaminoethyl methacrylate; allyl methacrylate; vinyl oxazoline ester of tall meso methacrylate; itaconic acid; acrylic acid; N-butyl methacrylate; ethyl methacrylate; hydroxy ethyl acrylate; acrylamide oil; acrylonitrile; methacrylic acid; and stearyl methacrylate.

In one embodiment of the present invention, co-polymers having polyhydroxystyrene (PHS) and/or one or more of the above acrylate monomers are some of the materials that can be purified by the novel processes of the present invention. It is to be understood the purification processes set forth herein can be used to purify any other monomer classes which have been polymerized by whatever method. These monomer classes include, without limitation, vinyl acetate, acrylics, styrenes, styrenes-acrylics, olefins such as ethylene and propylene, acrylonitrile, maleic anhydride, and mixtures thereof. The polymerization of these monomers can be carried out via cationic, anionic and/or free radical. These are other embodiments of the present invention. However, the description set forth herein is, for exemplary purposes only, generally directed to the acrylate, styrenic, styrenic/acrylate, styrenic/acrylate/norbornyl type monomers.

The polymerization, purification, and/or transesterification steps are carried out on an anhydrous basis (i.e. <about 5,000 ppm water). The first solvent for the polymerization is generally an alcohol having 1 to 4 carbon atoms and is selected from the group consisting of methanol, ethanol, propanol, isopropanol, t-butanol, and combinations thereof. However, other solvents such as ethyl acetate, methyl ethyl ketone, tetrahydrofuran, and the like can be used and this depends upon the monomer system which is to polymerized. The amount of solvent used is not critical and can be any amount which accomplishes the desired end result.

The free radical initiator for the polymerization may be any initiator that achieves the desired end result. The initiator may be selected from the group consisting of 2,2'-azobis(2,4-dimethylpentanenitrile), 2,2'-azobis(2-methylpropanenitrile), 2,2'-azobis(2-methylbutanenitrile), 1,1'-azobis(cyclohexanecarbonitrile), t-butyl peroxy-2-ethylhexanoate, t-butyl peroxypivalate, t-amyl peroxypivalate, diisononanoyl peroxide, decanoyl peroxide, succinic acid peroxide, di(n-propyl)peroxydicarbonate, di(sec-butyl)peroxydicarbonate, di(2-ethylhexyl)peroxydicarbonate, t-butylperoxyneodecanoate, 2,5-dimethyl-2,5-di(2-ethylhexanoylperoxy)hexane, t-amylperoxyneodecanoate, dimethyl 2,2'-azobisisobutyrate, and combinations thereof.

The initiator is typically selected from the group consisting of 2,2'-azobis(2,4-dimethylpentanenitrile), 2,2'-azobis(2-methylpropanenitrile), 2,2'-azobis(2-methylbutanenitrile), 1,1'-azobis(cyclohexanecarbonitrile), t-butyl peroxy-2-ethylhexanoate, t-butyl peroxypivalate, t-amyl peroxypivalate, and combinations thereof.

The polymerization conditions are not critical and can be any temperature and pressure that will produce the desired end result. In general, the temperatures are from about 30° C. to about 100° C., preferably from about 40° C. to about 100° C., and most preferably from about 45° C. to about 90° C. The pressure may be atmospheric, sub-atmospheric or super-atmospheric. The polymerization time is not critical, but generally will take place over a period of at least one minute in order to produce a polymer of corresponding composition.

Once the crude polymer is formed, it is subjected to the novel purification procedure wherein there is provided a solution which comprises a solvent (first solvent) containing the crude polymer; this is initially used as the starting material for the purification of the crude polymer via a multi-step fractionation process. Additional quantities of the first solvent can be added to the crude polymer mixture, and then the resultant solution is combined, for example, mixed/stirred, with a non solvent in order to precipitate the desired polymer from the overall mixture.

Depending upon the type of polymer formed in the polymerization reaction, the solvent will vary consistent with the degree of solubility of the crude polymer therein. Thus, the solvent containing the crude polymer is referred to as the first solvent and is more specifically defined as wherein the crude polymer is at least 40% by weight thereof is dissolved therein. This first solvent is selected from the group consisting of methanol, ethanol, t-butanol, proponal, isopropanol, ethyl acetate, methyl ethyl ketone, tetrahydrofuran, ethyl lactate, propylene glycol monomethyl ether acetate (PGMEA), propylene glycol monomethyl ether (PGME), and mixtures thereof.

In order to carry out the precipitation of the crude polymer from the first solvent, there is then added a non solvent to the solution containing the crude polymer and first solvent. The non solvent is thus defined as from a class of liquids wherein the crude polymer is at most 10% by weight thereof is dissolved therein. This non solvent is selected from the group consisting of water, hexanes, heptanes, methanol, toluene, and mixtures thereof. Again, the non solvent is polymer composition and molecular weight dependent and would thus be any liquid that could effectuate the precipitation of the crude polymer from the initial crude polymer/first solvent solution.

It is also important that the ratio of non solvent to (first) solvent be in the range of from about 1:1 to about 10:1, preferably from about 1:1 to about 5:1.

It is also preferred in both the use of the solvent and non solvent that these materials/liquids have a boiling point that is lower than the boiling point of the photoresist compatible solvent, herein after described. Furthermore, it is critical that both the solvent (first and third) and the non solvent be miscible with each other.

During the fractionation process, the non solvent/solvent can be stirred/mixed for more complete reaction and handling.

After the non solvent is combined with the solution containing the crude polymer (in solution in the first solvent) and the polymer precipitates out of solution, at least a portion of the first solvent and the non solvent are removed and then a third solvent is combined with the polymer in order to re-dissolve the polymer into solution. The third solvent can be the same as the first solvent or it can be another type of material selected from the same class of solvents mentioned herein and which permits at least 40% by weight of the polymer to be dissolved therein.

The fractionation process is singular or it can be repeated at least one more time until no further purification is identified, as for example, until a small sample of the decanted solvent, upon evaporation to dryness shows substantially no residue. This fractionation process is generally carried out 2 to 10 times.

One of the important measures of the degree of impurity of the crude polymer produced from the polymerization of the monomers is the polydispersity value. In general, it is desirable to have a low value, for example, less than about 3; the lower value is indicative that the polymerization reaction was more uniform in chain length. The uniqueness of this purification step is that the desired polymer formed is precipitated out by the use of non solvent and that the undesired, low molecular weight average polymers and undesired monomers remain and/or are soluble in the first solvent. Thus the novel purification/fractionalization step, provides the removal of these undesirable materials. In general, the polydispersity of the crude polymer is measured before, during and after this purification/fractionalization step, with the objective of reducing this value by at least 1%, preferably 1% to about 10%, of what the value of the original crude polymer was before the purification treatment. Preferably, it is desirable to yield a product whose polydispersity is below about 2.0. It is to be understood that polydispersity means the ratio of weight average molecular weight (Mw) over the number average molecular weight (Mn) as determined by Gel Permeation Chromatography (GPC).

Further treatment of the purified polymer may be carried out as one so desires depending upon the end use thereof. For example, if there is a transesterification step, the purified polymer from the polymerization step is subjected to said transesterification conditions in an alcoholic solvent in the presence of catalytic amounts of a base catalyst. (It is to be understood that after the purification step set forth above, there still remains some solvent mixed with the desired polymer, but additional solvent should be added in order to keep the polymer in a fluid state. The transesterification could be conducted without the addition of this additional solvent, but the reaction would be more difficult and possibly take longer.) The base catalyst is such that it will not substantially react with said alkyl acrylate monomer II, or with said co-polymerizable monomers (EUCM). The base catalyst is either an alkyl metal hydroxide or an alkyl metal alkoxide. The base catalyst is selected from the group consisting of lithium hydroxide, lithium methoxide, lithium ethoxide, lithium isopropoxide, sodium hydroxide, sodium methoxide, sodium ethoxide, sodium isopropoxide, potassium hydroxide, potassium methoxide, potassium ethoxide, potassium isopropoxide, cesium hydroxide, cesium methoxide, cesium ethoxide, cesium isopropoxide, and combinations thereof.

If a hydrolysis is utilized to effect removal of the phenol blocking group, the acid should be a member of the strong acids, as for example hydrochloric acid, hydrobromic acid, sulfuric acid, or the like.

Thus and according to the method of this invention, immediately after polymerization of the polymer or even after further process steps, the crude polymer is subjected to this novel fractionation process which provides a substantially purified polymer.

In another embodiment of the present invention, there is provided a solvent swap (for example after a transesterification step which uses a catalyst and the catalyst removal step). In this solvent swap step, the first or third solvent (containing the purified polymer) is then exchanged with an aprotic/organic solvent which is a photoresist compatible solvent, and the first or third solvent is removed by distillation. The term "photoresist compatible solvent" is one that is commonly used in the photoresist art as demonstrated in U.S. Pat. No. 5,945,251 (column 4, lines 17–27), U.S. Pat. No. 5,789,522 (column 13, lines 7–18) and U.S. Pat. No. 5,939,511, all of which men and which is set forth in the following Examples. All of these patents are incorporated herein by reference in toto. This photoresist compatible solvent can be a member selected from the group glycol ethers, glycol ether acetates and aliphatic esters having no hydroxyl or keto group. Examples of the solvent include glycol ether acetates such as ethylene glycol monoethyl ether acetate and propylene glycol monomethyl ether acetate (PGMEA).

This invention is further illustrated by the following examples that are provided for illustration purposes and in no way limits the scope of the present invention.

EXAMPLES (GENERAL)

In the Examples that follow, the following abbreviations are used:
THF—Tetrahydrofuran
MEK—Methyl ethyl ketone
MeOH—Methanol
PGMEA—Propyleneglycol monomethylether acetate
GPC—Gel permeation chromatography
GC—Gas chromatography General Analytical Techniques Used for the Characterization: A variety of analytical techniques were used to characterize the homo-, co- and terpolymers of the present invention that included the following:
GPC: Gel Permeation Chromatography was performed on a Waters gel permeation chromatograph equipped with refractive index detection.
GC: Gas Chromatography was performed on a Hewlett Packard Model 5890 series II gas chromatograph equipped with a DB-1 column (30 m×0.25 mm, 0.25 υm film) and FID detector.

EXAMPLES

Example 1

Reaction

To a three neck one liter flask, fitted with a condenser, mechanical stirrer, and a rubber septum, MEK (120.0 g) was added. The reactor was heated to 80.0° C. using a temperature controller. Then, a solution of methylmethacrylate (23.79 g, 0.2376 moles), 3-hydroxy-1-adamatylmethacrylate (7.00 g, 0.0297 moles), 5-norbornene-2-methacrylate (72.61 g, 0.3267 moles), and dimethyl-2,2'-azobisisobutyrate (5.51 g, 0.0237 moles) in MEK (120.06 g) was added slowly over a period of 220 minutes (1.65 g/min). The reactor was then maintained at 80° C. for an additional 150 minutes. The reactor was then cooled to room temperature forming a clear amber solution.

Purification

The above product was purified using reverse precipitation using MeOH as a non-solvent. To the stirred reactor, MeOH was slowly added (365.0 g) until a thick solid was formed. The stirrer was stopped and the solids were allowed to settle for a period of 60 minutes. Then, 683.4 g of the top solution layer was removed by suction. To the resulting solids, MEK (271.1 g) was added and the mixture was stirred until the solids were completely dissolved. Again, to the stirred reactor, MeOH was slowly added (363.9 g) until a thick solid was formed. The stirrer was stopped and the solids were allowed to settle for a period of 60 minutes. Then, 646.6 g of the top solution layer was removed by suction. To the resulting solids, MEK (202.1 g) was added and the mixture was stirred until the solids were completely dissolved. Finally, to the stirred reactor, MeOH was slowly added (337.8 g) until a thick solid was formed. The stirrer was stopped and the solids were allowed to settle for a period of 60 minutes. Then, 530.1 g of the top solution layer was removed by suction. To the resulting solids, MEK (151.0 g) was added and the mixture was stirred until the solids were completely dissolved. GPC results for the starting polymer and the end polymer showed a decrease of 15.2% in polydispersity value.

Example 2

Reaction

To a three neck one liter flask, fitted with a condenser, mechanical stirrer, and a rubber septum, MEK (180.0 g) was added. The reactor was heated to 80.0° C. using a temperature controller. Then, a solution of methylmethacrylate (35.68 g, 0.3564 moles), 3-hydroxy-1-adamatylmethacrylate (31.58 g, 0.1337 moles), 5-norbornene-2-methacrylate (89.12 g, 0.4010 moles), and dimethyl-2,2'-azobisisobutyrate (8.20 g, 0.0356 moles) in MEK (179.9 g) was added slowly over a period of 350 minutes (1.52 g/min). The reactor was then maintained at 80° C. for an additional 150 minutes. The reactor was then cooled to room temperature which formed an amber clear solution.

Purification

The above product was purified using reverse precipitation using MeOH as a non-solvent. To the stirred reactor, MeOH was slowly added (356.9 g) until a thick solid was formed. The stirrer was stopped and the solids were allowed to settle for a period of 60 minutes. Then, 410.7 g of the top solution layer was removed by suction. To the resulting solids, MEK (170.1 g) was added and the mixture was stirred until the solids were completely dissolved. Again, to the stirred reactor, MeOH was slowly added (361.2 g) until a thick solid was formed. The stirrer was stopped and the solids were allowed to settle for a period of 60 minutes. Then, 591.36 g of the top solution layer was removed by suction. To the resulting solids, MEK (194.4 g) was added and the mixture was stirred until the solids were completely dissolved. Finally, to the stirred reactor, MeOH was slowly added (389.9 g) until a thick solid was formed. The stirrer was stopped and the solids were allowed to settle for a period of 60 minutes. Then, 603.7 g of the top solution layer was removed by suction. To the resulting solids, MEK (414.9 g) was added and the mixture was stirred until the solids were completely dissolved.

Catalyst Removal

Catalyst impurities were removed by ion exchange using Amberlyst A15 ion exchange resin. 580.8 grams of the above product was passed through a treated column of Amberlyst A15 resin (1"×10") at a rate of 10 mL/min. 933.8 g of a low catalyst solution was obtained.

Solvent Swap

The above product was solvent swapped into PGMEA from MEK by vacuum distillation. To a four neck 2 liter flask, fitted with a thermowell, fractional distillation head and receiver, mechanical stirrer, and nitrogen inlet, 933.8 g of the above product was added. The volume of solution was reduced under vacuum (65 torr, 40° C.) and then 385.3 g of PGMEA was added. The residual MEK and MeOH were removed under vacuum (25 torr, 45° C.) until the level of MEK and MeOH were undetectable by GC. 164.1 g of PGMEA was added to the solids to adjust the solids concentration to 27.5 weight percent by density.

TABLE 1

GPC Results for example 1 showing increasing molecular weight and decreasing Polydispersity with each purification step.

| Sample Name | RT | Mw (Daltons) | Mn (Daltons) | Polydispersity |
| --- | --- | --- | --- | --- |
| First precipitation | 14.960 | 8779 | 4792 | 1.831 |
| Second precipitation | 14.806 | 9247 | 5074 | 1.822 |
| Third precipitation | 14.724 | 10182 | 6105 | 1.667 |
| Final MEK solution | 14.626 | 11224 | 7619 | 1.473 |
| Final PGMEA solution | 14.655 | 10815 | 7065 | 1.530 |

FIG. 1 shows the GPC Results for example 1 showing increasing molecular weight and decreasing polydispersity with each purification step.

Reverse Precipitation Purification of poly(4-hydroxystyrene) (methylmethacrylate) (ethyleneglycol dicyclopentadiene methacrylate).

Example 3

Reaction

To a five neck 50 liter reactor system, fitted with a mechanical stirrer, condenser and receiver system, nitrogen inlet, and thermowell, 4-acetoxystyrene (1.16 Kg, 7.15 moles), methyl-methacrylate (2.13 Kg, 21.3 moles), ethyleneglycol dicyclopentadiane methacrylate (18.59 Kg, 7.08 moles), and THF (9.88 Kg) was added. The reactor was heated to reflux (71.2° C.) and then 2-2'azobis-2,4-dimethylvaleronitrile (0.37 Kg, 1.49 moles) in 0.8 Kg of THF was added. The reactor was maintained at reflux for a period of 6 hours. The reactor was then cooled slightly and then 4.94 Kg of MeOH and 0.11 Kg of 25 wt % sodium methoxide in MeOH were added. The reactor was again heated to reflux and the overhead distillate was removed and replaced with THF over a period of 3 hours. The solution was then allowed to cool to room temperature which formed a clear red solution.

Purification

The above product was purified using reverse precipitation using MeOH as a non-solvent. To the stirred reactor, MeOH was slowly added (7.17 Kg) until a thick solid was formed. The stirrer was stopped and the solids were allowed to settle for a period of 30 minutes. Then, 4.64 Kg of the top solution layer was removed by suction. To the resulting solids, THF (2.48 Kg) was added and the mixture was stirred until the solids were completely dissolved. Again, to the stirred reactor, MeOH was slowly added (3.02 Kg) until a thick solid was formed. The stirrer was stopped and the solids were allowed to settle for a period of 30 minutes. Then, 7.50 Kg of the top solution layer was removed by suction. To the resulting solids, THF (2.30 Kg) was added and the mixture was stirred until the solids were completely dissolved. Finally, to the stirred reactor, MeOH was slowly added (3.44 Kg) until a thick solid was formed. The stirrer was stopped and the solids were allowed to settle for a period of 30 minutes. Then, 6.67 Kg of the top solution layer was removed by suction. To the resulting solids, THF (6.82 Kg) was added and the mixture was stirred until the solids were completely dissolved. GPC showed a decrease of 17.4% in the polydispersity value between the beginning polymer and the finished polymer.

Catalyst Removal

Catalyst impurities were removed by ion exchange using Amberlyst A15 ion exchange resin. The entire above product was passed through a treated column of Amberlyst A15 resin (4"×40") at a rate of 210 mL/min.

Isolation

The product is isolated by precipitation into water (10:1, water:solution) and the solids are washed with water and dried under vacuum (40 torr, 55 C, 3 days). 5.3 Kg of a fine white powder was obtained.

Reverse Precipitation Purification of poly(4-hydroxystyrene) (t-butylacrylate)

Example 4

Reaction

To a four neck 3 liter flask, fitted with a mechanical stirrer, condenser, nitrogen inlet, and thermowell, 4-acetoxystyrene (564.7 g, 3.48 moles), t-butylacrylate (49.6 g, 0.387 moles), and THF (710 g) was added. The reactor was heated to reflux (70.8° C.) and then 2-2'azobis-2,4-dimethylvaleronitrile (33.6 g, 0.135 moles) in 25 g of THF was added. The reactor was maintained at reflux for a period of 18 hours. The solution was then allowed to cool to room temperature which formed a clear amber solution.

Purification

The above product was purified using reverse precipitation using MeOH as a non-solvent. To the stirred reactor, MeOH was slowly added (1159 g) until a thick solid was formed. The stirrer was stopped and the solids were allowed to settle for a period of 30 minutes. Then, 1109 g of the top solution layer was removed by suction. To the resulting solids, THF (303 g) was added and the mixture was stirred until the solids were completely dissolved. Again, to the stirred reactor, MeOH was slowly added (1214 g) until a thick solid was formed. The stirrer was stopped and the solids were allowed to settle for a period of 30 minutes. Then, 1524 g of the top solution layer was removed by suction. To the resulting solids, THF (384 g) was added and the mixture was stirred until the solids were completely dissolved. Finally, to the stirred reactor, MeOH was slowly added (1188 g) until a thick solid was formed. The stirrer was stopped and the solids were allowed to settle for a period of 30 minutes. Then, 1644 g of the top solution layer was removed by suction. GPC of the solids obtained, showed a decrease of 22.3% in the polydispersity value between the beginning polymer and the finished polymer.

Deprotection

To the reactor, 405 g of MeOH and 4.76 g of 25 wt % sodium methoxide in MeOH was added. The reactor was again heated to reflux and the overhead distillate was removed and replaced with THF over a period of 4 hours.

Catalyst Removal

Catalyst impurities were removed by ion exchange using Amberlyst A15 ion exchange resin. The entire above product was passed through a treated column of Amberlyst A15 resin (2"×10") at a rate of 20 mL/min.

Isolation

The product is isolated by precipitation into water (10:1, water:solution) and the solids are washed with water and dried under vacuum (40 torr, 55 C, 3 days). 384.5 g of a fine white powder was obtained.

Reverse Precipitation Purification of poly(4-hydroxystyrene)

Example 5

Reaction

To a four neck 2 liter flask, fitted with a mechanical stirrer, condenser, nitrogen inlet, and thermowell, 4-acetoxystyrene (235.7 g, 1.45 moles) and THF (270 g) was added. The reactor was heated to reflux (70.8° C.) and then 2-2'azobis-2,4-dimethylvaleronitrile (9.0 g, 0.036 moles) in 13 g of THF was added. The reactor was maintained at reflux for a period of 16 hours. The solution was then allowed to cool to room temperature which formed a clear amber solution.

Purification

The above product was purified using reverse precipitation using MeOH as a non-solvent. To the stirred reactor, MeOH was slowly added (616 g) until a thick solid was formed. The stirrer was stopped and the solids were allowed to settle for a period of 30 minutes. Then, 658 g of the top solution layer was removed by suction. To the resulting solids, THF (145 g) was added and the mixture was stirred until the solids were completely dissolved. Again, to the stirred reactor, MeOH was slowly added (516 g) until a thick solid was formed. The stirrer was stopped and the solids were allowed to settle for a period of 30 minutes. Then, 663 g of the top solution layer was removed by suction. To the resulting solids, THF (148 g) was added and the mixture was stirred until the solids were completely dissolved. Finally, to the stirred reactor, MeOH was slowly added (517 g) until a thick solid was formed. The stirrer was stopped and the solids were allowed to settle for a period of 30 minutes. Then, 731 g of the top solution layer was removed by suction. GPC of the solids obtained, showed a decrease of 25.4% in the polydispersity value between the beginning polymer and the finished polymer.

Deprotection

To the reactor, 155 g of MeOH and 1.90 g of 25 wt % sodium methoxide in MeOH were added. The reactor was again heated to reflux and the overhead distillate was removed and replaced with MeOH over a period of 5 hours.

Catalyst Removal

Catalyst impurities were removed by ion exchange using Amberlyst A15 ion exchange resin. The entire above product was passed through a treated column of Amberlyst A15 resin (1"×15") at a rate of 15 mL/min.

Isolation

The product is isolated by precipitation into water (10:1, water:solution) and the solids are washed with water and dried under vacuum (40 torr, 55 C, 3 days). 148.6 g of a fine white powder is obtained.

While specific reaction conditions, reactants, and equipment are described above to enable one skilled in the art to practice the invention, one skilled in the art will be able to make modifications and adjustments which are obvious extensions of the present inventions. Such obvious extensions of or equivalents to the present invention are intended to be within the scope of the present invention, as demonstrated by the claims which follow.

What is claimed is:

1. A process for purifying a crude polymer which consists of the steps of (1) providing a solution of a crude polymer in a first solvent, (2) precipitating said crude polymer in said first solvent by combining with a non solvent in order to precipitate most of said polymer therefrom, (3) removing at least a portion of said first solvent and said non solvent from said precipitated polymer, (4) adding a third solvent to said precipitated polymer in order to redissolve said polymer in said third solvent, and (5) repeating steps (2) through (4) at least one more time until the polydispersity value of said purified polymer is about 1% less than the polydispersity value of the crude polymer.

2. The process as set forth in claim 1 wherein the crude polymer contains repeat units derived from a momoner or combination of monomers selected from the group consisting of styrenes, styrenes-acrylics, olefins, vinyl acetate, anhydrides, acrylics, acrylates, norbornenes, fluorinated acrylates, fluorinated methyacrylates, acrylonitriles, maleic anhydrides, and mixtures thereof.

3. The process as set forth in claim 1 wherein the first and third solvents are selected from a class of liquids wherein the crude polymer is at least 40% by weight thereof is dissolved therein.

4. The process as set forth in claim 1 wherein the non solvent is selected from a class of liquids wherein the crude polymer is at most 10% by weight thereof is dissolved therein.

5. The process as set forth in claim 1 wherein the ratio of non solvent to first and/or third solvent used therein is from about 1:1 to about 10:1.

6. The process as set forth in claim 3 wherein the first and/or third solvents are selected from the group consisting of methanol, ethyl acetate, methyl ethyl ketone, tetrahydrofuran, propyleneglycol monoethylether, propyleneglycol monoethylether acetate and mixtures thereof.

7. The process as set forth in claim 4 wherein the non solvent is selected from the group consisting of water, hexanes, heptanes, methanol, ethanol, diethylether methylene chloride, toluene, and mixtures thereof.

8. A method of purifying crude polymers containing repeat units derived from a monomer or monomers selected from the group consisting of (1) acyloxystyrene or alkoxy styrene of the group consisting of

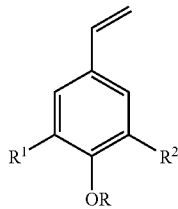

wherein R is either —C(O)R$^5$ or —R$^5$;
(2) an acrylate monomer having the formula II,

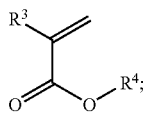

(3) one or more ethylenically unsaturated copolymerizable monomers taken from the group consisting of styrene, 4-methylstyrene, styrene alkoxide wherein the alkyl portion is $C_1$–$C_5$ straight or branch chain, tert.-butylstyrene, cyclohexyl acrylate, tert.-butyl acrylate, tert.-butyl methacrylate, maleic anhydride, dialkyl maleate, dialkyl fumarate and vinyl chloride, wherein:
 i) R$^1$ and R$^2$ are the same or different and independently selected from the group consisting of:
  hydrogen,
  fluorine, chlorine, bromine,
  alkyl and fluoroalkyl group having the formula $C_nH_xF_y$, where n is an integer from 1 to 4, x and y are integers from 0 to 2n+1, and the sum of x and y is 2n+1,
  phenyl, and tolyl;
 ii) R$^3$ is selected from the group consisting of:
  hydrogen,
  methyl, ethyl, n-propyl, iso-propyl, n-butyl, iso-butyl, and tert.-butyl;
 iii) R$^4$ is methyl, ethyl, n-propyl, iso-propyl, n-butyl, 1-butyl, tert.-butyl, t-amyl, benzyl, cyclohexyl, 9-anthacenyl, 2-hydroxyethyl, cinnamyl, adamantyl, methyl or ethyl or
hydroxyl adamantyl, isobornyl, 2-ethoxyethyl, n-heptyl, n-hexyl, 2-hydroxypropyl, 2-ethylbutyl, 2-methoxypropyl, 2-(2-methoxyethoxyl), oxotetrahydrofuran, hydroxy trimethylpropyl, oxo-oxatricyclo nonyl, 2-naphthyl, 2-phenylethyl, phenyl,
  and mixtures thereof; and
 iv) R$^5$ is $C_1$–$C_4$ alkyl
and (4) mixtures of (1), (2), and (3), consisting of (a) providing a solution of a crude polymer in a first solvent, (b) combining a non solvent with said first solvent and crude polymer to precipitate most of said crude polymer therefrom, (c) removing at least a portion of said first solvent and said non solvent from said precipitated polymer, (d) adding a third solvent to said precipitated polymer in order to redissolve said polymer in said third solvent, and (e) repeating said steps (b)–(d) at least one more time until the polydispersity value of the purified polymer is about 1% less than that polydispersity value of the crude polymer.

9. The process as set forth in claim 8 wherein the first solvent is selected from the group consisting of ethyl acetate, methyl ethyl ketone, tetrahydrofuran, methanol, ethanol, propanol, isopropanol, t-butanol, propyleneglycol monomethylether, propylene glycol monomethylether acetate, and mixtures thereof.

10. The process as set forth in claim 8 wherein the acyloxystyrene is acetoxystyrene monomer and is the only monomer used.

11. The process as set forth in claim 10 wherein the acetoxystyrene polymer in purified form has a polydispersity value of less than 2.0.

12. The process as set forth in claim 11 wherein the first solvent is methanol.

13. The process as set forth in claim 8 wherein the acrylate monomer is the only one used.

14. The process as set forth in claim 8 wherein the monomers of item (3) are the only monomers used.

15. The process as set forth in claim 8 wherein the entire process is conducted on an anhydrous basis.

16. The process as set forth in claim 15 wherein step (e) is conducted from about 2 to about 10 times.

17. The process as set forth in claim 8 wherein the solvents and non-solvents are miscible with each other.

18. The process as set forth in claim 17 wherein the non-solvent is added to the crude polymer dissolved in the first solvent.

19. The process as set forth in claim 18 wherein the first and third solvents are different materials.

20. A method of purifying crude polymers consisting of (a) providing a solution of a crude polymer in a first solvent, (b) combining a non solvent with said first solvent and crude polymer in order to precipitate said polymer therefrom, (c) removing at least a portion of said first solvent and said non solvent from said precipitated polymer, (d) adding a third solvent to said precipitated polymer in order to re-dissolve said polymer in said third solvent, and (e) repeating said steps (b)–(d) until the polydispersity value of the purified polymer is about 10% less than that polydispersity value of the crude polymer.

21. The process as set forth in claim 20 wherein the first and third solvents are selected from the group consisting of ethyl acetate, methyl ethyl ketone, tetrahydrofuran, methanol, ethanol, propanol, isopropanol, t-butanol, propyleneglycol monomethylether, propyleneglycol monomethylether acetate, and mixtures thereof.

22. The process as set forth in claim 21 wherein there is an additional step (f) wherein said third solvent is removed and replaced by a photoresist compatible solvent.

23. The process as set forth in claim 20 wherein the crude polymer is derived from a monomer or combination of monomers selected from the group consisting of acrylates, vinyl acetate, acrylics, styrenes, styrenes-acrylics, olefins, acrylonitrile, maleic anhydride, norbornenes, fluorinated acrylates, silanes, fluorinated methylacrylates, and mixtures thereof.

24. The process as set forth in claim 20 wherein after the purification step, the third solvent containing said purified polymer is removed and replaced by a photoresist compatible solvent which is selected from the group consisting of glycol ethers, glycol ether acetates, aliphatic esters having no hydroxyl or keto group, and mixtures thereof.

25. A process for purifying a crude polymer, consisting of:
(a) providing a solution of a crude polymer in a first solvent;
(b) combining said crude polymer and first solvent with a non-solvent in order to precipitate at least a portion of said polymer; and (c) removing a portion of said first solvent and said non-solvent from said precipitated polymer, with the proviso that said first solvent and said non-solvent are miscible with each other.

26. The process as set forth in claim 25, further comprising (d) adding a third solvent to said precipitated polymer in order to re-dissolve said polymer therein and repeating steps (b)–(d) at least one more time, with the proviso that said third solvent is miscible with said first solvent and said non-solvent.

* * * * *